No. 728,167. PATENTED MAY 12, 1903.
C. A. HARDY.
DISK ATTACHMENT FOR GRAIN DRILLS.
APPLICATION FILED JAN. 7, 1903.
NO MODEL. 2 SHEETS—SHEET 1.

Witnesses
E. F. Stewart
Wm Bagger

C. A. Hardy, Inventor;
by C. A. Snow & Co.
Attorneys

THE NORRIS PETERS CO., PHOTO-LITHO., WASHINGTON, D. C.

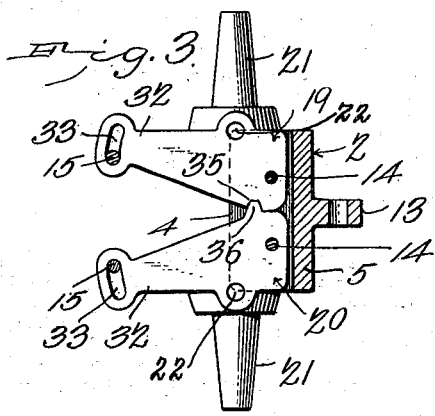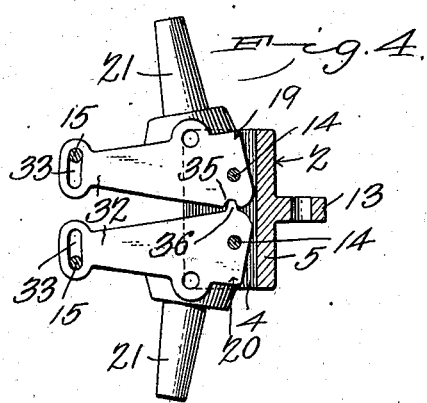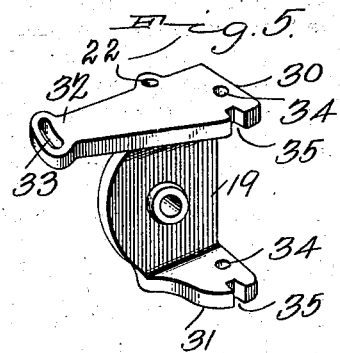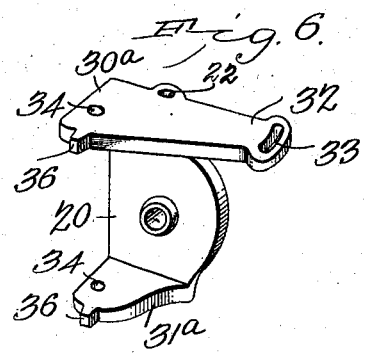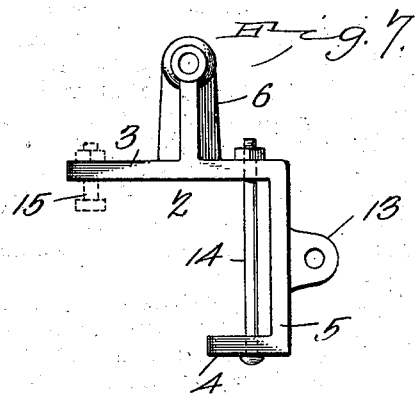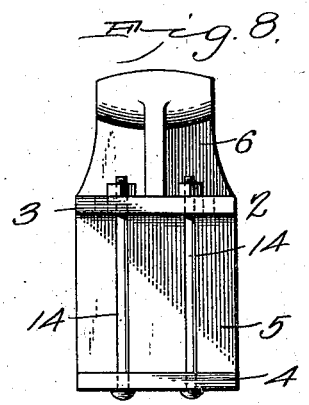

No. 728,167. Patented May 12, 1903.

UNITED STATES PATENT OFFICE.

CLEMENT A. HARDY, OF MOLINE, ILLINOIS, ASSIGNOR TO THE FULLER MANUFACTURING COMPANY, OF EAST MOLINE, ILLINOIS.

DISK ATTACHMENT FOR GRAIN-DRILLS.

SPECIFICATION forming part of Letters Patent No. 728,167, dated May 12, 1903.

Application filed January 7, 1903. Serial No. 138,160. (No model.)

*To all whom it may concern:*

Be it known that I, CLEMENT A. HARDY, a citizen of the United States, residing at Moline, in the county of Rock Island and State of Illinois, have invented a new and useful Disk Attachment for Grain-Drills, &c., of which the following is a specification.

This invention relates to disk attachments for grain-drills and for other disk implements, such as cultivators, harrows, and seeders; and it has for its object to provide an attachment of this class which shall possess superior advantages in point of simplicity, durability, and general efficiency.

In disk implements as heretofore constructed it has been difficult to so space the disks that the center pair of opposing disks could be so adjusted as to meet the varying conditions of soil and yet be close enough together to permit the seed to be deposited at the same distances apart as the other disks in the implement or to properly cultivate the strip of ground between them and to leave proper clearance between them for the passage of loose soil and trash. By my present invention I aim to so support the disks pivotally in a hanger as to permit them to be easily adjusted at the proper pitch, to so interlock the pivotal supports that the adjustment of both disks constituting the pair shall of necessity be simultaneous and of equal extent, and by which the disks when properly adjusted may be securely locked in the desired position.

With these and other objects in view my invention consists in the improved construction, arrangement, and combination of parts, which will be hereinafter fully described, and particularly pointed out in the claims.

Figure 1:
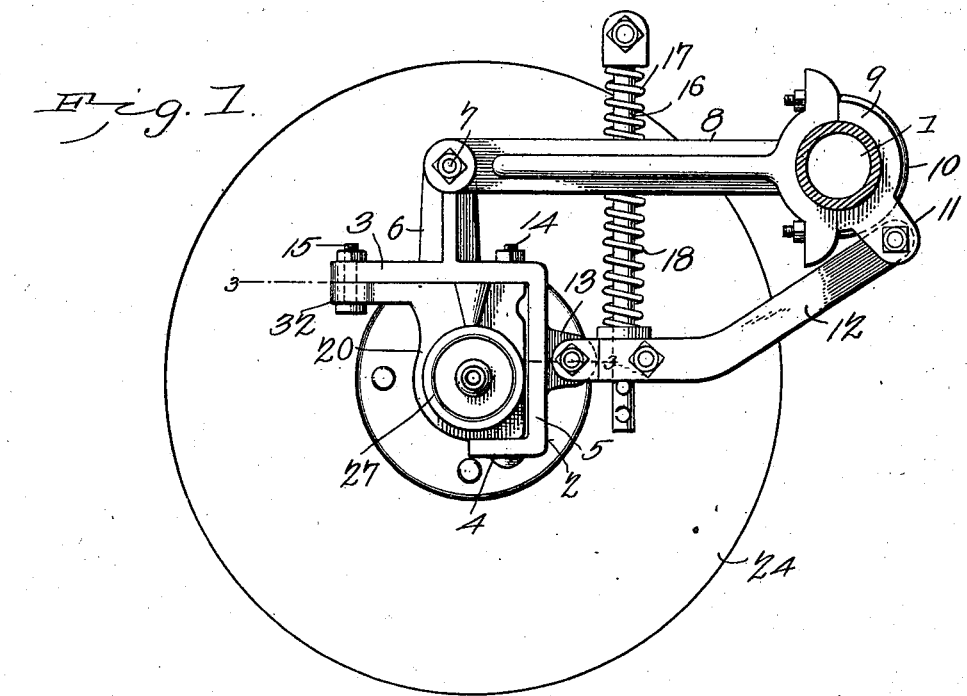
Figure 2:
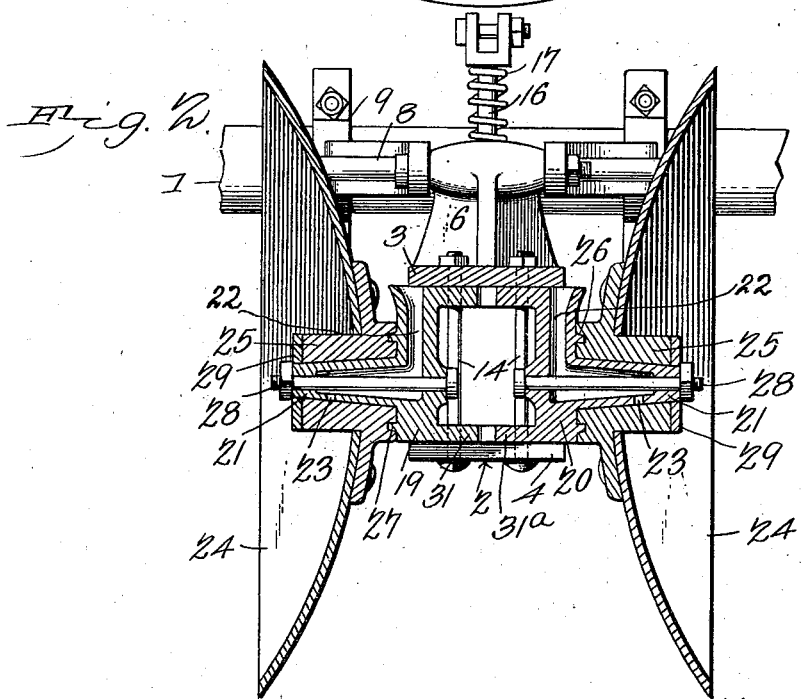

In the accompanying drawings, Figure 1 is a side elevation of a disk-supporting hanger constructed in accordance with my invention with the disks supported therein, said view showing in transverse section the supporting-bar upon which the hanger is mounted. Fig. 2 is a vertical sectional view taken axially through the disks. Fig. 3 is a sectional detail view taken on the line 3 3 in Fig. 1. Fig. 4 is a view similar to Fig. 3, but showing the disk-carrying arms in a different position. Figs. 5 and 6 are perspective details of the right and left hand disk-carrying arms. Fig. 7 is a side elevation of the hanger, and Fig. 8 is a front view of the same.

Corresponding parts in the several figures are indicated by similar numerals of reference.

1 designates a supporting-bar, here illustrated as a tubular bar, which forms a part of the machine or implement to which my invention is applied and which is no part of the present invention.

2 designates the hanger. This may be described as consisting of a casing comprising a top plate 3 and a bottom plate 4, connected by a rear wall 5, which normally occupies an approximately vertical position. The top plate 3 extends forwardly beyond the bottom plate 4, and it is provided with an upwardly-extending transversely-perforated lug 6, forming a bracket, which is connected, by means of a bolt 7, with the forward end of an arm 8, the rear end of which has a boxing 9, whereby it is mounted, as by means of a clip 10, upon the supporting-bar 1. The boxing 9 has a lug 11, connected by a brace 12 with a lug 13 upon the rear side of the hanger. The top and bottom plates are provided with perforations for the passage of pivotal bolts 14, and the projecting front end of the top plate 3 is provided with additional perforations for the passage of the securing-bolts 15. A bolt 16, having springs 17 18 coiled thereon, extends through the arm 8 and brace 12 in rear of the hanger, thus providing the necessary flexible connection.

The disk-supporting arms 19 and 20 are provided with outwardly-extending spindles 21, which are tapered, as shown, and upon which the disks are mounted for operation. The spindles are hollow and are provided with upwardly-extending oil-channels 22, through which lubricant may be supplied. The under sides of said spindles are also provided with openings 23 for the passage of such lubricant to the bearings. In the example shown in the drawings the disks 24 are provided with hubs 25, provided on their inner sides with annular grooves 26, engaging annular flanges 27 upon the outer sides of the disk-carrying arms, forming perfect joints, which prevent the entrance of dirt into the bearings. The disks are mounted upon the spindles by means of bolts 28 and washers 29, the heads of the bolts being seated upon the inner sides of the disk-carrying arms. The latter are provided at their upper and lower ends with lateral inwardly-extending brackets 30 and 31 and 30ª and 31ª, the former of which, being the upper ones 30 and 30ª, are extended forwardly to form handles 32, provided with segmental slots 33, to be engaged by the securing-bolts 15. The brackets 30 31 30ª 31ª are also provided with perforations 34 for the reception of the pivot-bolts 14, whereby they are mounted in the hangers. The brackets 30 and 31 of the arm 19 are provided at their inner edges with notches 35 to engage teeth 36, projecting from the edges of the brackets 30ª 31ª of the arm 20. It will thus be seen that when the said disk-carrying arms are mounted in the hanger in operative position they will be interlocked by means of the said teeth and notches, so that the adjustment of one is rendered impossible without the simultaneous corresponding adjustment of the other.

The operation and advantages of this invention will be readily understood from the foregoing description, taken in connection with the drawings hereto annexed.

The method of assembling the parts will be clearly evident by reference to Fig. 2, where it will be seen that the pivotal bolts 14 serve to mount the disk-carrying arms in the hanger. By reference to Figs. 3 and 4 different positions of said disk-carrying arms will be ascertained, and it is obvious that said arms may be equally well adjusted at points intermediate between the extremes shown in said figures. It is also obvious that by lengthening the slots 33 the range of adjustment may be increased. By tightening the nuts upon the adjusting-bolts 15 the disk-carrying arms may be retained securely at any desired adjustment.

I desire it to be understood that while I have in the foregoing described the preferred form of my invention I do not necessarily limit myself to the structural details herein set forth, but reserve the right to any changes and modifications which may be resorted to within the scope of my invention and without departing from the spirit or sacrificing the utility of the same.

I have described my invention as being located in front of the supporting-bar 1, which necessarily implies that the disks will be pushed in a forward direction by means applied to the said bar. It is obvious that the supporting-bar may without departing from my invention be disposed in front of the disks, which will thus be pulled instead of being pushed. The changes necessary to effect this modification will be obvious to any mechanic skilled in the art to which the invention appertains.

Having thus described my invention, I claim—

1. A device of the class described, comprising a hanger having top and bottom plates, disk-supporting means mounted pivotally between said top and bottom plates, said supporting means being provided with outwardly-extending spindles and with forwardly-extending arms having segmental slots, and means for connecting said slotted arms with the top plate of the hanger.

2. In a disk-supporting device, the combination with a casing of disk-supporting devices, each comprising a plate having outwardly-extending spindles and laterally inwardly extending arms provided with coacting notches and projections, said arms having pivotal connection with the top and bottom plates.

3. A disk-carrying device comprising a casing and disk-carrying means mounted pivotally between the top and bottom plates of said casing and having outwardly-extending hollow spindles and upwardly-extending oil-channels, said spindles being provided with openings for the escape of the lubricant.

4. In a disk-supporting device, the combination of a casing having top and bottom plates, disk-supporting members mounted pivotally between said top and bottom plates and having toothed connection with each other, hollow spindles extending outwardly from said disk-supporting members and provided with upwardly-extending oil-channels and openings for the escape of the lubricant, and means for securing said disk-supporting members in adjusted position.

5. In a device of the class described, a hanger, flexible supporting means for said hanger, disk-carrying arms having outwardly-extending spindles and inwardly-extending brackets mounted pivotally in said hanger, said brackets being provided with interlocking teeth and notches, and means for securing the disk-supporting elements at various points of adjustment.

6. In a device of the class described, a hanger having top and bottom plates, the upper plate extended beyond the lower one, disk-supporting elements mounted pivotally between said plates and having interlocking teeth and notches, segmentally-slotted arms extending from the said disk-carrying elements and bolts connecting said arms adjustably with the projecting top plate of the hanger.

In testimony that I claim the foregoing as my own I have hereto affixed my signature in the presence of two witnesses.

CLEMENT A. HARDY.

Witnesses:
D. H. LYONS,
E. P. LUCKLUM.